Jan. 14, 1936.  M. LEEUWIN  2,027,918
DEVICE INDICATING THE POSITION OF ADJUSTABLE
PARTS OF RADIO SETS AND THE LIKE
Filed April 17, 1933   2 Sheets-Sheet 1
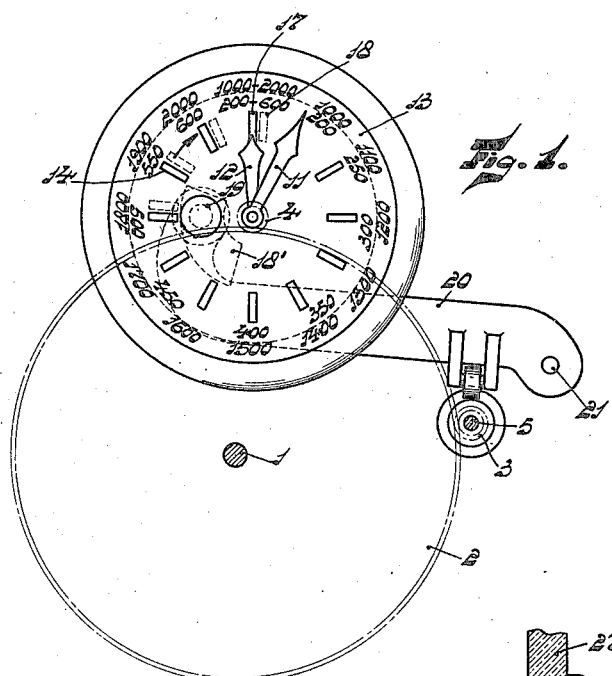
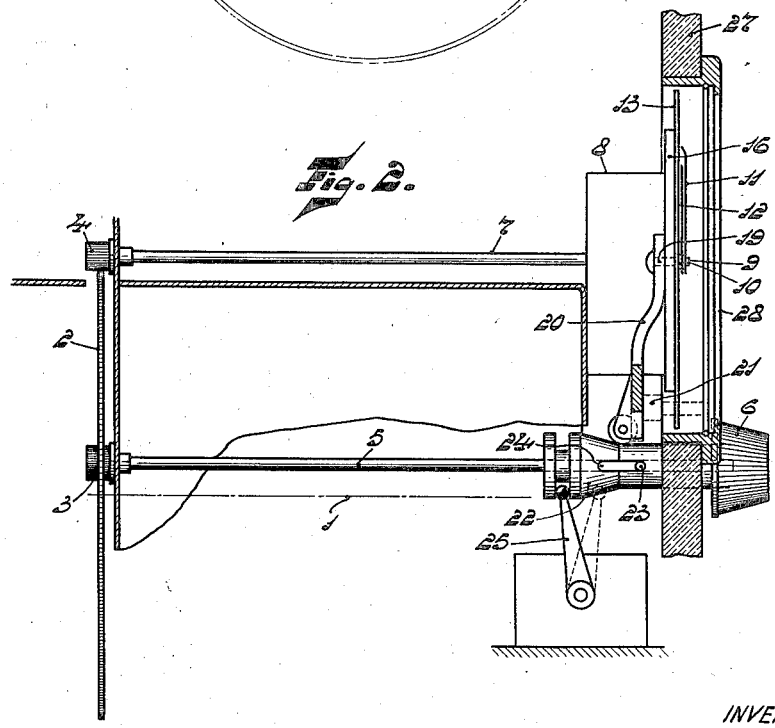
INVENTOR
MAX LEEUWIN
BY
*H. G. Grover*
ATTORNEY

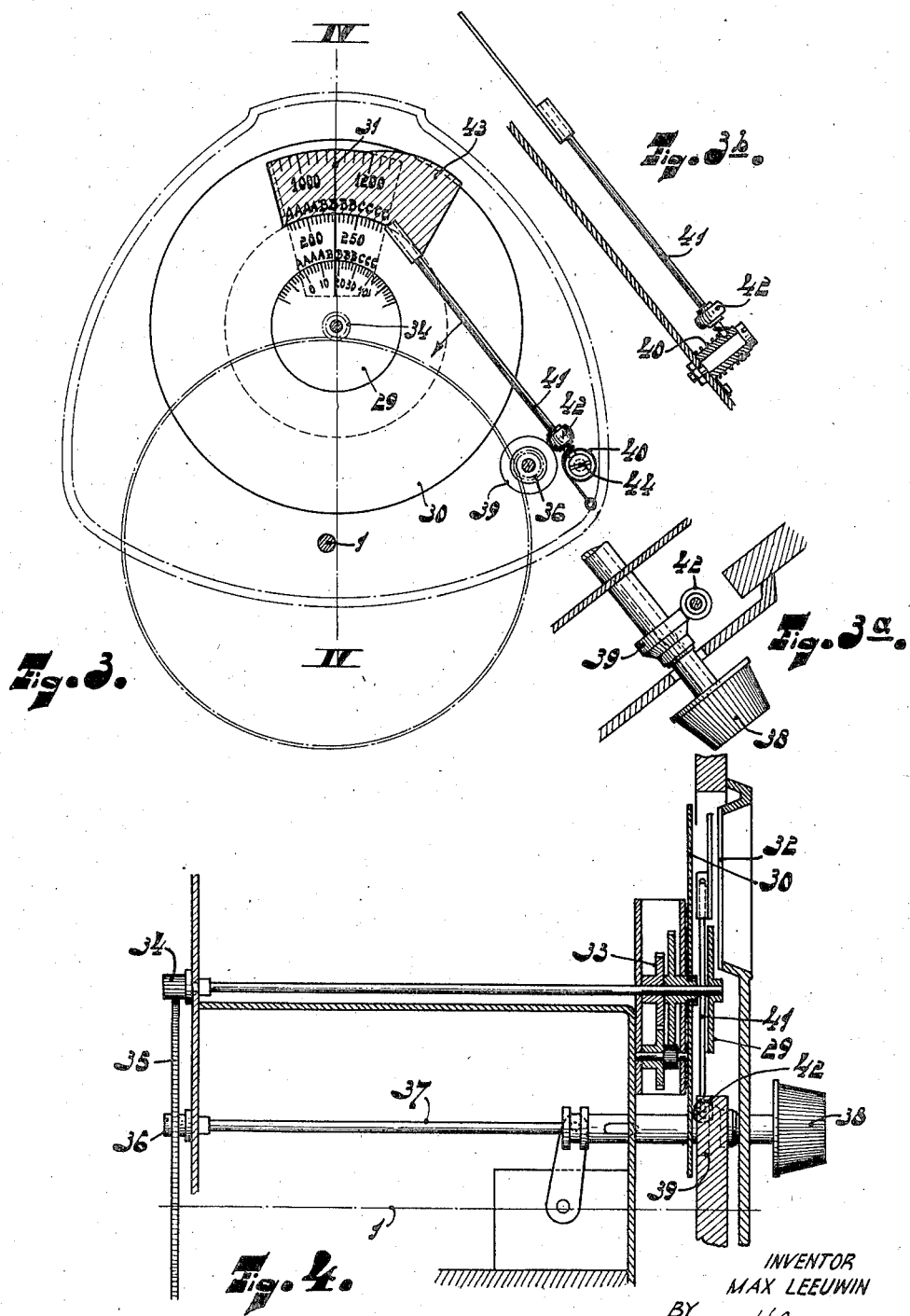

Patented Jan. 14, 1936

2,027,918

UNITED STATES PATENT OFFICE 2,027,918

DEVICE INDICATING THE POSITION OF ADJUSTABLE PARTS OF RADIO SETS AND THE LIKE

Max Leeuwin, Eindhoven, Netherlands, assignor to Radio Corporation of America, a corporation of Delaware Application April 17, 1933, Serial No. 666,566
In Germany April 16, 1932

2 Claims. (Cl. 116—124.1)

(Granted under the provisions of sec. 14, act of March 2, 1927; 357 O. G. 5)

Radio sets are known in which a dial is moved in front of a reading window by means of a control knob, said dial or scale being provided with a division. It has already been proposed to plot numbers on the scale which numbers indicate the wave length and are placed at the graduations. However, it has been found that such a scale cannot be subdivided finely enough for adjusting the scale quickly and exactly to the point at which the apparatus is correctly tuned to a given broadcasting station. In fact, one has to resort to estimations.

The present invention has for its purpose to provide means by which the precise adjustment of a radio set is highly facilitated. According to the invention a unitary mechanism is coupled with the adjustable part of a condenser or the like, which mechanism is provided with two differently shaped indicating members which move at different speeds on adjusting the part, the axis of rotation of said markers being spaced apart from the regulating spindle of the part.

The idea underlying the invention is as follows: In the ordinary apparatus are commonly arranged one or more members comprising adjustable parts, viz. control knobs, whose position is indicated by a direct transmission, for instance, by a movable dial in the manner referred to above. According to the invention a mechanism is coupled with the adjustable part, or with the shaft of such a knob, said mechanism working about as a micrometer by means of which the position of the regulating shaft may be controlled more finely. This mechanism may be simply mounted on the shaft as an additional part. In order to facilitate the reading, the indicating members of the "micrometer" must, in accordance with the invention, receive an entirely different shape.

In one form of construction of the invention the indicating members are shaped as hands of a clock, which hands move over a scale with hour division and with numbers indicating the wave lengths. At the circumference of the scale are provided twelve graduations and at these graduations are plotted members indicating the wave lengths. Preferably two series of wave length numbers are plotted, for instance, a series of 200 to 600 m. and a series of 1000 to 2000 m. According to whether the apparatus is adjusted to one of these wave ranges the scale may be differently shaped or receive a different appearance, for instance by providing differently coloured screens behind inspection holes of the scale, which screens are moved by the wave length knobswitch or by providing differently coloured light sources throwing their light on or through the scale, thus indicating to which wave length range the apparatus is adjusted. In practice such an indicating device works very satisfactorily on account of its psychlogical effect. The operator need only bear in mind that this apparatus, when the provided "clock" indicates a given number, is accurately tuned to a definite broadcasting station. The drawing represents furthermore another form of construction of the invention in which the indicating members are constituted by rotary discs which are moved past a mark stroke and one of which is provided in addition to marks indicating the wave length, with a wreath of letters whereas another disc bears a fine division having numbers plotted on it, so that these indicating members are well distinguished from each other. For a definite adjustment only a letter and a number of the fine division need be noted. Furthermore, means may be provided for giving the scale a different appearance when adjusting the apparatus to a different wave length.

The device according to the invention may be very advantageously used in the modern apparatus controlled by a single knob, since in view of the large number of stations transmitting within a given wave region, an accurate adjustment of this knob is imperative for tuning correctly to the different stations.

The invention will be more clearly understood by reference to the accompanying drawings representing, by way of example, some forms of construction thereof.

Fig. 1 is a front view of one form of construction.

Fig. 2 is a schematical lateral view, partially in section, thereof.

Fig. 3 shows another form of construction.

Figs. 3A and 3B are detail views; and

Fig. 4 is a side view of the device shown in Fig. 3.

To the rotor shaft 1 of a condenser which is not represented in Fig. 1 is secured a driving disc 2 having a toothed or roughened circumference. This disc meshes with two toothed or roughened spurwheels 3 and 4, the spurwheel 3 is mounted on the shaft 5 of the adjusting knob 6 and the other spurwheel is fixed on the shaft 7 leading to the transmission lodged in the casing 8.

From the casing 8 project, as it is the case with a clock, a shaft 9 and a hollow shaft 10 surrounding the former, which shafts carry the long hand 11 and the short hand 12 respectively.

Preferably, the transmission between the shafts 9 and 10 is 12:1, as it is the case with a clock.

Behind the hands is placed a scale 13, provided with graduations and several apertures 14. On this scale are plotted two series of numbers indicating the wave length in meters.

Through the apertures 14 a screen 16 is visible which is movable about a shaft 10. The screen is provided with differently coloured faces 17 and 18, so that other colours appear behind the graduations and the aperture when displacing the screen 16.

In order to move the screen 16 a lever 20 is movable fixed to the screen at 19 (Figure 2). The lever is movable about the point 21. To the knob 6 is secured a sleeve 22 having a conically enlarging end. This sleeve is movable in an axial direction on the shaft 5 through the path determined by the pin 23 fixed to the shaft 5.

The pin 23 engages a slit 24 of the sleeve 22. On displacing the sleeve the wave length switch 25 is moved. Due to this movement the lever 20 is lifted by the conical end of the sleeve 22, so that the screen is displaced when changing over the apparatus to another wave range.

The front wall of the apparatus is designated by 27 and the glass window by 28.

Fig. 3 shows a device in which the indicating members are constituted by two concentric discs 29 and 30. The disc 29 is provided at its circumference with a subdivision in fine strokes and corresponding numbers. The other disc bears a scale comprising two concentric rings, viz. one for the wave lengths of 200 to 600 meters and a second ring for the wave lengths of 1000 to 2000 metres. On each ring is plotted a series of letters. On the disc is read at the strokes 31 provided on the reading window 32 (Fig. 4) the position B, 18 for instance. The discs are coupled together by means of the transmission 33. The mechanism is coupled again with the adjustable rotor of the condenser through the intermediary of a spurwheel 34 meshing with a disc 35 secured to the condenser shaft 1. With the disc 35 meshes a second spurwheel 36 secured to the shaft 37 on which the control knob 38 is movably mounted. The knob 38 is connected to a sleeve 39 which has partly a conical shape. Against the thus obtained projecting part of the sleeve is pressed by means of the spring 40 the roll 42 which is movably arranged on the rod 41 (Figs. 3, 3A and 3B). If the knob is pressed the roll 42 leaves the projecting part and the rod 41 is turned about the point 44 in the direction indicated by the arrow on Fig. 3. To the end of the rod is screwed a mask 43 by which is rendered invisible a different part of the disc 30 in both possible positions of the rod 41.

Fig. 4 shows that by pressing the knob 38 also the wave length switch is operated.

I claim:

1. In combination with the tuning instrumentality of a multi-range radio receiver or the like, selecting means for adjusting the tuning instrumentality to operate within any desired one of a plurality of frequency ranges, operable means providing for adjustment of said tuning instrumentality within the selected range, frequency range indicating means operative upon operation of the selecting means to adjust the tuning instrumentality to operate within one of the frequency ranges to characterize the selectance of any particular range, said indicating means comprising a visual indicator including a plurality of differently colored elements each one thereof characterizing a particular one of said frequency ranges.

2. In combination with the tuning instrumentality of a multi-range radio receiver or the like, means for adjusting the tuning instrumentality to operate on any desired one of a plurality of frequency ranges, operable means for providing a continuous adjustment of the tuning instrumentality from one end to the other of each of the different frequency ranges, a single control member for operating both said last named means, and indicating means operative upon operation of the first named means, when selecting one of the plurality frequency ranges, to characterize the selectance of the particular range selected, said indicating means comprising a light source and a plurality of differently colored screens arranged so as to produce a visible indication, each screen being adapted to characterize the selectance of any particular one of the frequency ranges.

MAX LEEUWIN.